Figure 1:
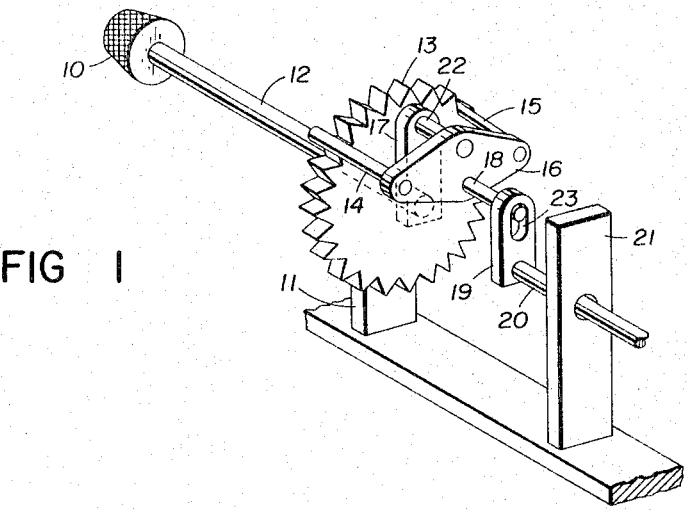
Figure 2:
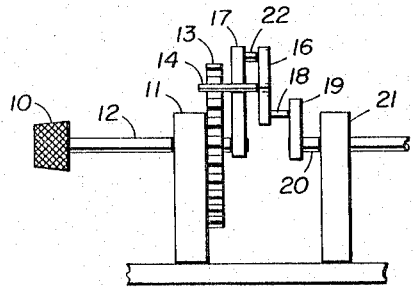

Feb. 7, 1967 W. F. WILLIAMS 3,302,472
INTERMITTENT ROTARY MECHANISM
Filed July 29, 1965

INVENTOR.
WINSTON F. WILLIAMS
BY Moody & Hallacher
ATTORNEYS United States Patent Office 3,302,472
Patented Feb. 7, 1967

3,302,472
INTERMITTENT ROTARY MECHANISM

Winston F. Williams, Cedar Rapids, Iowa, assignor to Collins Radio Company, Cedar Rapids, Iowa, a corporation of Iowa Filed July 29, 1965, Ser. No. 475,822
6 Claims. (Cl. 74—84)

This invention relates generally to a rotary motion translating mechanism and particularly to a mechanism which translates continuous rotary motion into intermittent rotary motion or oscillatory motion.

It is frequently desirable to modify rotary motion such that the angular output exceeds the angular input by a predetermined multiple. It is also frequently desirable to not only increase the output but also to obtain intermittent motion at the output while maintaining a constant input. An example of an area where an intermittent motion is desirable is a rotary switching mechanism wherein a plurality of switching points are arranged in a circular fashion and it is necessary to switch through successive points while maintaining a constant input. When switching from one point to another it is frequently desirable to have a constant motion of a wiper arm between the two points and upon reaching the second point to delay at that point for a predetermined time before moving to the next successive point. There are many other applications where an intermittent rotary motion is desired, the above is given as explanatory only.

Many prior art devices have attempted to yield such motion but have many disadvantages in that there is slippage between various gears which comprise the devices and also because many of them are chain driven and consequently render it difficult to realize a positive periodic motion followed by a subsequent zero motion of the wiper arm.

It is therefore an object of this invention to provide a mechanism which translates a constant rotary input to an intermittent rotary output.

It is another object of this invention to provide a mechanism which steps up the rotary output for a predetermined angular input and then gives a zero output for an additional predetermined angular input of the same amount.

It is another object of this invention to provide a mechanism which gives two increments of output for the first increment of input and zero output for the second increment of input.

It is another object to provide a device which gives 30° output for the first fifteen degrees of input and gives zero output for the second fifteen degrees of input.

It is another object to provide such devices which are operative for both clockwise and counterclockwise rotary inputs.

It is another object to provide such devices which do not utilize step-up gears, chains or sprockets and which have only three moving parts.

Further objects, features, and advantages of the invention will become apparent from the following description and claims when read in view of the accompanying drawings, wherein like numerals indicate like parts and in which:

FIGURE 1 shows an isometric view of the inventive device;

FIGURE 2 shows an embodiment which yields an intermittent output.

Referring now to FIGURES 1 and 2 which show a star gear 13 rigidly attached to support 11. An input shaft 12 which is rotated by a torque applied to knob 10 rotatably passes through support 11 and star gear 13. This torque can be applied either manually or by an automatic control device. A crank 17, one end of which is rigidly attached to input shaft 12, rotates along with shaft 12. A shaft 22 extending from the other end of crank 17 is rotatably attached to toggler 16 to effect rotation of said toggler along with rotation of crank 17. Rigidly attached to toggler 16 are follower arms 14 and 15 running parallel to input shaft 12. Follower arms 14 and 15 are contiguous with the contoured edge of star gear 13. Toggler 16 carries shaft 18 which slideably rests in slot 23 at one end of a second crank 19. At the other end of crank 19 an output shaft 20 is rigidly attached to said crank.

In operation a turning force upon knob 10 rotates shaft 12 and thereby effects a rotation of crank 17. Because crank 17 is connected through shaft 22 to toggler 16 said toggler also rotates along with crank 17. Rotation of toggler 16 causes follower arms 14 and 15 to follow the contour of star gear 13. For a portion of the rotation, follower arms 14 and 15 will follow the advance sides of the teeth of star gear 13. This motion causes toggler 16 to rotate about shaft 22 which then causes shaft 18 to move against one side of slot 23. This causes rotation of output shaft 20. As defined herein the advance sides of star gear 13 are those which cause motion of shaft 20 as follower arms 14 and 15 slide therealong. The sides of star gear 13 which cause no motion of shaft 20 are defined as dwell sides. It should be noted that the distance between shaft 22 and shaft 18 is such that crank 19 is caused to rotate two increments for each increment of rotation of input shaft 12. As follower arms 14 and 15 move along the teeth of star gear 13 one arm (14 in the instant shown) approaches an apex of a tooth while the other arm (15 in the instant shown) approaches the base of a tooth. When follower arm 14 reaches the apex of a tooth and follower 15 reaches the base of a tooth the direction of motion of the follower arms will change. The change of motion causes toggler 16 to rotate about shaft 18 instead of shaft 22, as before. During this period shaft 18 is free to rotate in slot 23 and therefore there is no output motion translated to output shaft 20. The follower arms 14 and 15 are now on the dwell sides of the gear teeth. This motion will continue until the follower arms 14 and 15 respectively reach the base and apex of the teeth, i.e., return to the advance sides of the teeth, at which point the motion of the arms is again changed. This change results in toggler 16 again rotating about axis 22 again effecting a rotation of output shaft 20. Star gear 13 is designed with a sufficient number of teeth to permit the intermittent motion of output shaft 20 to occur every 15 degrees of input.

The embodiment of FIGURES 1 and 2 yields an intermittent output motion. That is the first 15° of input to shaft 12 yields a 30° output of shaft 20. The next 15° of input yield zero output. The third 15° of input yield another 30° of output and this relationship continues for an entire 360° rotation of the input shaft. It should therefore be noted that although 360° rotation of the input shaft yields a 360° rotation of the output shaft the output rotation is intermittent in 30° increments.

Although this invention has been described with respect to a particular embodiment thereof, it is not to be so limited, as changes and modifications may be made therein which are within the spirit and scope of the invention as defined by the appended claims.

I claim:

1. A rotary mechanism comprising; an input shaft and an output shaft, a fixedly mounted star wheel, connecting means receiving an input from said input shaft, toggler means for receiving motion from said connecting means, follower means for causing said toggler means to follow the periphery of said star wheel when said input shaft is in motion, and crank means for imparting the motion of said toggler means to said output shaft so that a constant input on said input shaft causes an intermittent rotary output of said output shaft each time said follower means slide up and down the teeth of said star wheel.

2. The rotary mechanism of claim 1 wherein said follower means is a plurality of rigid members rigidly fastened to said toggler means.

3. The rotary mechanism of claim 2 wherein said crank means is elongated and contains an elongated slot, said connecting means is an elongated member having one end connected to said input shaft and the other end connected to said toggler means, and said toggler is slidably engaged by said slot, and the other end of said crank holds said output shaft.

4. The rotary mechanism of claim 1 wherein said connecting means is an elongated member having one end connected to said input shaft and the other end connected to said toggler means.

5. The rotary mechanism of claim 1 including a slot in one end of said crank means, and wherein said toggler is slideably engaged by said slot, and the other end of said crank means holds said output shaft.

6. A rotary mechanism comprising an input shaft and an output shaft, a crank connected to said input shaft, a toggler connected to said crank so that rotation of said input shaft causes rotation of said toggler, a fixedly mounted star wheel, at least one follower arm extending from said toggler and contiguous with the edge of said star wheel so that rotation of said toggler causes said follower arm to follow the contour of said star wheel, an elongated crank arm having a slot therein connected to said toggler by a pin extending from said toggler into said slot, said crank arm being connected to said output shaft so that the motion of said output shaft is rotationally intermittent as rotation of said input shaft causes said follower arm to follow the contour of said star wheel.

References Cited by the Examiner

UNITED STATES PATENTS

| 206,832 | 8/1878 | Schroder et al. | 74—54 |
| 587,156 | 7/1897 | Nold | 74—54 |
| 2,199,561 | 5/1940 | Fuller et al. | |

FOREIGN PATENTS

| 670,090 | 9/1963 | Canada. |
| 906,877 | 3/1954 | Germany. |
| 16,897 | 1904 | Great Britain. |

MILTON KAUFMAN, *Primary Examiner.*

FRED C. MATTERN, *Examiner.*

D. H. THIEL, *Assistant Examiner.*